United States Patent [19]

Matsui et al.

[11] Patent Number: 4,582,776
[45] Date of Patent: Apr. 15, 1986

[54] INFORMATION RECORDING DISC HAVING LIGHT ABSORBING CELLULOSE NITRATE COATING

[75] Inventors: Fumio Matsui; Manabu Sugano, both of Tokorozawa, Japan

[73] Assignee: Pioneer Electronic Corporation, Tokyo, Japan

[21] Appl. No.: 425,397

[22] Filed: Sep. 28, 1982

[30] Foreign Application Priority Data

Oct. 9, 1981 [JP] Japan ............................ 56-161123
Oct. 9, 1981 [JP] Japan ............................ 56-161124
Oct. 9, 1981 [JP] Japan ............................ 56-161125
Oct. 9, 1981 [JP] Japan ............................ 56-161126

[51] Int. Cl.$^4$ ...................... G03C 1/76; G06K 7/00
[52] U.S. Cl. .................................. 430/270; 428/64;
346/135.1; 346/76 L; 430/531; 430/641;
430/911; 235/488; 250/568
[58] Field of Search ............. 430/270, 641, 911, 531;
428/64; 346/150, 76 L, 135.1; 235/488;
250/568

[56] References Cited

U.S. PATENT DOCUMENTS 3,985,915 10/1976 Gipstein et al. .................... 430/270
4,097,895 6/1978 Spong ............................. 346/135.1
4,195,313 3/1980 Bell et al. ........................ 346/135.1
4,230,939 10/1980 de Bont et al. .................. 346/135.1
4,412,231 10/1983 Namba et al. ................... 346/135.1
4,430,401 2/1984 Wilkinson ....................... 346/135.1

Primary Examiner—Jack P. Brammer
Attorney, Agent, or Firm—Schwartz, Jeffery, Schwaab, Mack, Blumenthal & Evans

[57] ABSTRACT

An information recording disc comprising a generally circular substrate having a polished major surface, a light-reflective coating formed on the polished major surface of the substrate, and a light-absorptive coating formed on the surface of the light-reflective coating and formed with information tracks each consisting of a succession of spaced pits in the light-absorptive coating, the light-absorptive coating being composed of a mixture of cellulose nitrate and a dye sensitizer exhibiting a noticeable light absorptivity in response to light with a predetermined wavelength, the cellulose nitrate being prepared from a starting cellulose containing at least about 97% of alpha-cellulose. If desired, the light-reflective coating may be dispensed with so that the light-absorptive information recording coating is formed directly on the polished surface of the substrate.

6 Claims, 2 Drawing Figures

INFORMATION RECORDING DISC HAVING LIGHT ABSORBING CELLULOSE NITRATE COATING

FIELD OF THE INVENTION

The present invention relates to an information recording disc for use as, for example, a video disc or a digital audio disc and further to a process of producing such an information recording disc.

BACKGROUND OF THE INVENTION

An information recording disc such as a digital audio and video disc has usually been produced by a photoresist etching process. At an initial stage of the photoresist etching process, a disc-shaped substrate of, for example, glass having a polished flat major surface is rinsed and thereafter cooled at a predetermined temperature. About an hour is consumed for these steps. The substrate of glass is then coated with a thin layer of photoresist and the resultant laminar structure is prebaked and cooled at a predetermined temperature. Another hour is required for these steps. Upon completion of the cooling step, the light-absorptive photoresist coating of the laminar structure is irradiated with a beam of, for example, laser light which is modulated in intensity in accordance with the signals to be recorded on the disc. About one to two hours are required for this step. The laminar structure having the light-absorptive coating thus processed is then developed, rinsed in water, dried, afterbaked and thereupon further cooled, about an hour being required for these steps. Spiral or coaxial information tracks each consisting of a succession of spaced pits arranged in patterns representative of the pieces of information to be reproduced are formed on the surface of the light-absorptive coating of the photoresist thus processed. A light-reflective coating of metal is then applied to the surface of the light-absorptive coating, about forty five minutes being required for this step. The disc blank now having the light-absorptive and light-reflective coatings on the substrate of glass is transferred to an inspection stage where the disc blank is played back on an experimental basis so as to check for any flaws such as dropouts of signal level. The inspection stage requires a period of about one to two hours. If found acceptable at this stage, the disc blank is transferred to a stage where a stamper is produced are replicas produced in quantity from the stamper.

A total of four to five hours are thus required from the step of preparing an initial substrate to the step of inspecting the substrate coated with the light-reflective metal coating. This means that an information recording disc can not be rejected or determined as being acceptable earlier than about four to five hours after the original substrate is coated with photoresist. If the recording disc produced turns out not to be acceptable at the inspection stage, viz., four to five hours after the original substrate has been coated with the photoresist, another disc must be produced by repeating all the steps above described. This is manifestly detrimental to the economy and efficiency of producing an information recording disc. Such a problem results from the fact that the signals recorded on the disc can not be reproduced or monitored immediately after the signals are recorded or while the signals are being recorded on the photoresist coating on the substrate.

The disc produced may also be rejected if the disc, on which the signals to be recorded have been properly recorded, is developed for an unduly extended or short period of time. Because, furthermore, of the fact that the photoresist is sensitive not only to a beam of laser light but to natural light, the laminar structure having the coating of the photoresist can not be processed in natural light. This is also detrimental to the efficiency of production of an information recording disc. All these problems encountered in producing an information recording disc basically result from the fact that a photoresist is used to form the light-absorptive, information recording coating of the disc.

The signals recorded on the light-absorptive coating on a substrate can be monitored during recording of the signals in a process taught in, for example, U.S. Pat. No. 4,097,895. In the prior-art process therein disclosed, a light-absorptive information recording coating of an organic dye (fluorescein) which is absorptive exclusively to light of a predetermined wavelength is formed on a light-reflective coating of aluminum preliminarily formed on a disc-shaped substrate of glass. When the recording coating of the disc thus composed is irradiated with a beam from an argon laser, the dye exhibits a noticeable absorptivity in response to a laser beam of the particular wavelength and causes ablation of the coating and produces a pit at the irradiated spot. The information recording coating thus formed with pits is then irradiated with a beam from an argon laser with a power selected to be less than the power of the initial laser radiation. The secondarily radiated laser beam is insufficient in power to be capable of causing ablation of the light-absorptive coating of the dye so that the beam is reflected at those spots where the reflective coating underlying the absorptive coating is exposed through the pits formed by the initial laser radiation. At the undisturbed areas, viz., those areas of the light-absorptive coating where the layer of the dye has not been irradiated with the laser beam, the secondarily radiated laser beam is absorbed and is as a consequence not reflected (or is reflected only to a negligible degree). The presence or absence of a pit and accordingly the signal recorded on the disc can be detected through detection of the difference between the luminous energy of the laser beam incident on the exposed light-reflective coating and that of the laser beam incident on the light-sensitive information recording coating.

The process taught in U.S. Pat. No. 4,097,895 is advantageous in that the signals recorded on an information recording disc composed of a substrate and light-reflective and light-absorptive coatings can be monitored during recording thereof, in that a wet developing step is not needed, and in that the disc with the light-absorptive coating can be processed in the light since the dye forming the coating shows a noticeable absorptivity exclusively in response to a beam of light of a predetermined wavelength. These advantages are however offset by the prolonged period of time required for causing the ablation of the dye and the difficulty encountered in forming clear-cut pits in the light-absorptive recording coating. The failure to achieve clear-cut pits in the light-absorptive coating results in a degraded signal-to-noise ratio of the resultant information recording disc.

An improved version of the process taught in the above named patent is disclosed in, for example, Japanese Provisional Patent Publication No. 55-87595 and the article titled "Real-Time Laser Recording Using Dye Vaporization Recording Substance" in Procedings of Institute of Electronics and Communications Engineers of Japan (CMP 79-59) issued on Nov. 22, 1979, Tokyo. In the process disclosed therein, a laser beam of a predetermined wavelength is focused on an information recording disc consisting of a substrate of acryl or a transparent coating of polyester or polyethylene and a coating of the mixture of a dye sensitizer and cellulose nitrate dissolved in a solvent of the ketone family. The dye sensitizer may be Ethyl Red, Methylene Blue or Brilliant Green and the cellulose nitrate used has a degree of polymerization approximating 80. The wavelength of the laser beam to be used with such an information recording disc is selected so that the dye sensitizer exhibits an exceptional absorptivity in response to the particular wavelength.

The use of cellulose nitrate in addition to a dye in forming a light-absorptive information recording coating permits the information recording coating to be sublimated at an increased rate due to the self-oxidation effect of the cellulose nitrate. The information recording disc produced in such a process is therefore advantageous in that the ablation of the light-absorptive coating proceeds in a reduced period of time, in that a laser beam of a reduced power can be used in forming pits in the recording coating or, in other words, signals can be recorded on the coating at a reduced temperature and in that the pits formed in the light-absorptive coating have configurations clearer than those of the pits formed in an information recording disc produced in the process originally proposed in U. S. Pat. No. 4,097,895. Problems are, however, still encountered in the advanced process in that the clearness of the configurations of the pits is inferior to that of the pits formed in a light-absorptive coating of photoresist and in that the reaction of the dye and cellulose nitrate with the laser radiation produces considerable quantities of chemical residua on the surface of the light-absorptive coating. The chemical residua thus deposited on the light-absorptive coating impair the signal-to-noise ratio of the resultant information recording disc. By reason of these problems, the process still remains at an experimental stage of research and development and is not acceptable as means to supercede the conventional photoresist etching process when put into practice on a commercial basis.

It is, accordingly, an important object of the present invention to provide an information recording disc which will permit monitoring of the signals during or immediately upon completion of the recording of the signals on a light-absorptive information recording coating.

It is another important object of the present invention to provide an information recording disc which can can be produced without having recourse to the wet developing step which is required in a conventional photoresist etching process.

It is still another important object of the present invention to provide an information recording disc having an excellent signal-to-noise ratio.

It is still another important object of the present invention to provide an information recording disc having a light-absorptive information recording coating formed with satisfactorily clear-cut pits.

It is still another important object of the present invention to provide an information recording disc which can be produced with practically negligible quantities of chemical residua produced on the surface of the light-absorptive coating by irradiation of the information recording coating of the disc with a recording beam of light.

It is, yet, another important object of the present invention to provide a process of producing an information recording disc of the above described nature.

SUMMARY OF THE INVENTION

In accordance with one outstanding aspect of the present invention, there is provided an information recording disc comprising a generally circular substrate having a polished major surface, and a light-absorptive coating formed on the polished major surface of the substrate and formed with information tracks each consisting of a succession of spaced pits in the light-absorptive coating, the light-absorptive coating being composed of a mixture of cellulose nitrate and a dye sensitizer exhibiting a noticeable light absorptivity in response to light with a predetermined wavelength, the cellulose nitrate being prepared from a starting cellulose containing at least about 97% of alpha-cellulose. As an alternative, an information recording disc according to the present invention may comprise a generally circular substrate having a polished major surface, a light-reflective coating formed on the polished major surface of the substrate, and a light-absorptive coating formed on the surface of the light-reflective coating and formed with information tracks each consisting of a succession of spaced pits in the light-absorptive coating, the light-absorptive coating being composed of a mixture of cellulose nitrate and a dye sensitizer exhibiting a noticeable light absorptivity in response to light with a predetermined wavelength, the cellulose nitrate being prepared from a starting cellulose containing at least about 97% of alpha-cellulose.

In accordance with another outstanding aspect of the present invention, there is provided a process of producing an information recording disc, comprising the steps of preparing a generally circular substrate having a polished major surface, forming a light-absorptive coating on the polished major surface of the substrate, the light-absorptive coating being composed of a mixture of cellulose nitrate and a dye sensitizer exhibiting a noticeable light absorptivity in response to light with a predetermined wavelength, the cellulose nitrate being prepared from a starting cellulose containing at least about 97% of alpha-cellulose, and irradiating the surface of the light-absorptive coating with a beam of light having the aforesaid wavelength for forming information tracks each consisting of a succession of spaced pits in the light-absorptive coating. As an alternative, a process according to the present invention may comprise the steps of preparing a generally circular substrate having a polished major surface, forming a light-reflective coating on the polished major surface of the substrate, forming a light-absorptive coating on the surface of the light-absorptive coating, the light-absorptive coating being composed of a mixture of cellulose nitrate and a dye sensitizer exhibiting a noticeable light absorptivity in response to light with a predetermined wavelength, the cellulose nitrate being prepared from a starting cellulose containing at least about 97% of alpha-cellulose, and irradiating the surface of the light-absorptive coating with a beam of light having the aforesaid wavelength for forming information tracks each consisting of a succession of spaced pits in the light-absorptive coating.

BRIEF DESCRIPTION OF THE DRAWING

The features and advantages of a process according to the present invention and an information recording disc produced by such a process will be more clearly appreciated from the following description taken in conjunction with the accompanying drawing in which.

DETAILED DESCRIPTION OF THE INVENTION

Figure 1:
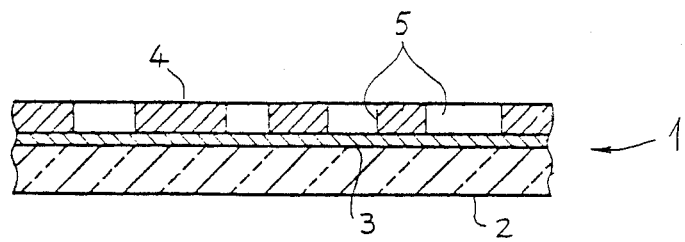
FIG. 1 is a fragmentary cross sectional view showing an information recording disc embodying the present invention.

Referring to FIG. 1 of the drawing, an information recording disc embodying the present invention, as designated in its entirety by reference numeral 1, comprises a generally circular substrate 2 which has been preliminarily processed to have a flat polished major surface. The information recording disc 1 further comprises a light-reflective coating 3 of metal such as, for example, silver or aluminum formed on the polished major surface of the substrate 2 and a light-absorptive coating 4 consisting of a mixture of cellulose nitrate and a dye sensitizer and formed on the light-reflective coating 3. The light-absorptive coating 4 is formed with spiral or coaxial information tracks of spaced pits 5 which are arranged in patterns representative of the signals to be reproduced. The information recording disc 1 herein shown is assumed, by way of example, to be for use as a master matrix from which a number of replicas are to be produced and, thus, the substrate 2 is made of transparent glass. If the disc 1 is to be used as a final record, then the substrate 2 may be formed of a synthetic resin such as polyester or acryl.

At an incipient stage of the process of producing the information recording disc 1, the glass substrate 2 is rinsed, cooled and thereafter formed with the light-reflective coating 3. The light-reflective coating 3 is vacuum evaporated, sputtered or otherwise applied onto the polished major surface of the substrate 2 to a predetermined thickness which may range from about 200 angstrom units to about 400 angstrom units. If the thickness of the coating 3 is less than the lower limit of this range, a sufficient amount of luminous energy could not be obtained when a signal pick-up laser beam is focused on the light-reflective coating 3 during monitoring of the signals recorded on the disc at a later stage. On the other hand, a thickness of the light-reflective coating 3 exceeding the upper limit of the range above specified would result in a mere waste of material although such a thickness would cause no problem in respect of the function of the resultant information recording disc. Experiments have proved that, when the light-reflective coating 3 is formed to the thickness of about 200 angstrom units, the reflectance of the light-reflective coating 3 to a beam of helium-neon laser used as a signal pick-up medium is within the range of between about 80% and about 85%.

Purified cotton linters containing 97% or more of alpha-cellulose are preferable as the starting cellulose to prepare the cellulose nitrate in the light-absorptive coating 4. If the proportion of the alpha-cellulose in the cotton linters is less than 97%, the result is that considerable quantities of chemical residua are produced and deposited on the surface of the light-absorptive information recording coating 4 as a result of the reaction of the mixture of the cellulose nitrate and dye sensitizer with laser radiation and accordingly that a satisfactory signal-to-noise ratio could not be achieved of the resultant information recording disc. The number average degree of polymerization of the cellulose nitrate containing the alpha-cellulose in a proportion within the range above specified is preferably within the range of from about 80 to about 95 (which corresponds to RS $\frac{1}{2}$ in JIS=Japanese Industrial Standard). A lesser degree of polymerization of the cellulose nitrate would make it difficult to form satisfactorily clear-cut pits to be formed in the light-absorptive coating 4, while a higher degree of polymerization would result in an excessive viscosity of the cellulose nitrate and make it difficult to achieve uniformity of thickness of the light-absorptive coating 4. The cotton linters to produce such cellulose nitrate is nitrated with, for example, a mixture of nitric acid, sulfuric acid and water as usual. In this instance, the degree of nitration of the starting cellulose is preferably selected to be higher than about 13% or, more preferably, than 13.32%. If the degree of nitration of the cotton linters is lower than about 13%, pits could not be formed in the light-absorptive coating 4 unless a signal recording beam of a considerably increased power is used. The use of an excessively powerful laser beam would result in deterioration in the configurations of the pits 5 formed in the light-absorptive coating 4. The cellulose nitrate prepared as above described is dissolved in a suitable organic solvent such as xylene or a mixed solution of xylene and ethyl cellosolve acetate and the resultant solution is passed through a filter of a predetermined mesh size of, for example, 0.2 micrometer.

The dye sensitizer in the light-absorptive coating 4 is W-ethyl-N-oxyethylaniline. The dye sensitizer is also dissolved in a suitable organic solvent such as xylene or a mixed solution of xylene and ethyl cellosolve acetate and the resultant solution is passed through a filter of, for example, the above specified mesh size.

Thereupon, the solution containing the cellulose nitrate and the solution containing the dye sensitizer are mixed together in a proportion selected so that the cellulose nitrate and dye sensitizer are contained in a predetermined weight ratio in the resultant mixture. A suitable organic solvent is added to the mixture in a volume selected so that the solvent is in the ratio of about 46 milliliters to 1 gram of the mixture of the cellulose nitrate and dye sensitizer. The resultant mixed solution is heated to about 40° C. and is shaked for about four hours. The mixed solution is then passed through a filter of, for example, the above specified mesh size and is thereafter applied to the light-reflective coating 3 on the substrate 2.

Figure 2:
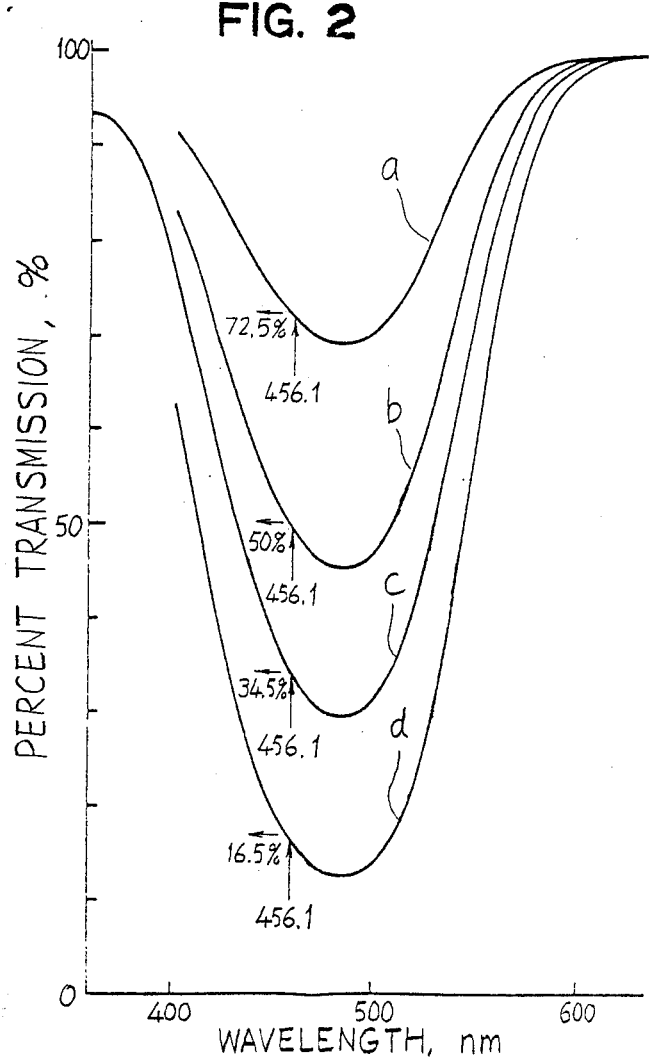
FIG. 2 is a graph showing examples of the relationship between the percentage transmission and the wavelength of the layers composed of cellulose nitrate and dye sensitizer in various proportions.

When the ratio by weight between the cellulose nitrate and dye sensitizer forming the light-absorptive coating 4 is varied, the percent transmission of light through the coating 4 varies in terms of wavelength of light as indicated in the graph of FIG. 2. In FIG. 2, plots a, b, c and d show the variations of the percent transmission as observed when the ratio by weight between the cellulose nitrate and the dye sensitizer is selected at 95.0:5.0, 90.0:10.0, 86.5:13.5 and 80.0:20.0, respectively. From these plots a, b, c and d it will be seen that the layer of the cellulose nitrate and dye sensitizer exhibits a noticeable absorptivity in response to light of a wavelength within the range of between about 440 nanometers and about 530 nanometers in every case and that the larger the proportion of the dye sensitizer the higher the percent transmission of light. When, for example, the weight ratio between the cellulose nitrate and dye sensitizer is selected at 86.5:13.5 as indicated by plot c, the kinematic viscosity of the mixture of the cellulose nitrate and dye sensitizer becomes 3.6 centistokes at the temperature of 25° C. and the layer of the cellulose nitrate and dye sensitizer exhibits the percent transmission of about 35% and accordingly the percent absorption of about 65% when irradiated with a beam of argon laser having the wavelength of 456.1 nanometers The mixed solution to form the light-absorptive coating 4 is applied to the surface of the light-reflective coating 3 by a spin coating process. For this purpose, 10 milliliters of the mixed solution is dropwise applied to the surface of the light-reflective coating 3, whereupon the laminar structure of the substrate 2 and light-reflective coating 3 is driven for rotation about the center axis thereof at the speed of 250 rpm for the period of 11 seconds and thereafter further at the speed of 600 rpm for the period of 61 seconds. By these steps in which the laminar structure is driven for rotation first at a relatively low speed and thereafter at a higher speed, the mixed solution applied to the surface of the light-reflective coating 3 forms a layer having a uniform thickness of about 2500 angstrom units as the light-absorptive information recording coating 4.

The laminar structure thus composed of the substrate 2, light-reflective coating 3 and light-absorptive coating 4 is then baked at the temperature of about 80° C. for the period of about 20 minutes so that the organic solvent is removed from the light-absorptive coating 4. Removing the solvent from the light-absorptive coating 4 is important since, if the organic solvent remains in the light-absorptive coating 4, then the information recording laser beam to form the pits 5 in the coating 4 in a later step must be emitted with a power required not only for causing ablation of the light-absorptive coating 4 but also for evaporating the solvent from the coating 4. Irradiation of the light-absorptive coating 4 with a beam of light of an insufficient power would lead to failure to form acceptable pits in the light-absorptive coating 4 and further to creation of chemical residua on the surface of the coating 4. Depending upon the type of the dye sensitizer used, furthermore, evaporation of the organic solvent from the light-absorptive coating 4 might cause irregularity of thickness of the coating 4. The dye sensitizer consisting of N-ethyl-N-oxyethylaniline is free from such a problem. After the organic solvent has been completely removed from the light-absorptive coating 4, the laminar structure of the substrate 2 and the light-absorptive and light-reflective coatings 3 and 4 is cooled for a certain period of time.

The step thus forming the light-absorptive coating 4 on the light-reflective coating 3 is followed by a mastering step to form the information tracks of the spaced pits 5 in the light-absorptive coating 4. In this mastering step, the laminar structure is driven for rotation at a predetermined circumferential speed of, for example, 1.25 meters per seconds and is concurrently irradiated with a beam of argon laser emitted with a wavelength of 456.1 nonometers and modulated in intensity with eight-to-fourteen modulated audio signals. Because of the noticeable absorptivity of the dye sensitizer in response to the laser beam of the particular wavelength, the dye sensitizer is caused to sublime by the heat generated in the light-absorptive coating 4 at those spots of the coating 4 at which the laser beam is focused. In the presence of the cellulose nitrate admixed to the dye sensitizer, furthermore, the cellulose nitrate is also caused to sublime by reason of the self-oxidation effect thereof. The sublimation of the cellulose nitrate promotes the sublimation of the dye sensitizer so that the layer of the cellulose nitrate and the dye sensitizer is ultimately formed with the spaced pits 5 as shown in FIG. 1. Those areas of the light-absorptive coating 4 where the laser beam has not been focussed remain undisturbed and intact. Since the ablation of the light-absorptive coating 4 can not be caused unless the beam of light having the predetermined wavelength in response to which the dye sensitizer in the light-absorptive coating 4 exhibits a noticeable light absorptivity is incident on the light-absorptive coating 4 with an energy level higher than a predetermined threshold value, the laminar structure including the light-absorptive coating 4 can be processed and/or treated in the light not only during the mastering step but also during other steps of the disc forming process.

The signals recorded on the disc blank produced in this manner can be read out by irradiating the blank with a beam of helium-neon laser of the 0.3 milliwatt power and 632.8 nanometer wavelength. The theoretical principle accounting for the fact that the signals can thus be reproduced in this fashion is not exactly known at this stage of the research and development. Here, suffice it to say that a principle is not such that, since the dye sensitizer used exhibits practically no light absorptivity in response to the wavelength of the helium-neon laser beam, the intensity of the light reflected from the light-absorptive coating 4 increases at least at the pits 5 in the light-absorptive coating 4 with a consequent decrease in the intensity of the light reflected from the coating 4 over the remaining undisturbed areas of the coating 4. (Such a principle may be applied to reproduction of the signals provided an argon laser beam is used as a signal pick-up medium.) The principle accounting for the fact that the signals can be reproduced by a helium-neon laser beam may probably be that the intensity of the light reflected from the light-absorptive coating 4 decreases at the pits 5 due to the diffraction or interference of light taking place at the pits 5 and increases over the remaining undisturbed areas due to the presence of the light-reflective coating 3 underlying the light-absorptive coating 4. At all events, it is of importance for practical purposes that the signals recorded on the recording disc 1 can be reproduced by the use of a helium-neon laser beam as a signal pick-up medium. While a signal reproducing apparatus using an argon laser beam requires incorporation of an extra cooling equipment into the apparatus and is for this reason practically limited to industrial use, an apparatus using a helium-neon laser beam is applicable to home and private use (and has already been put into market) since the helium-neon laser beam can be used as a signal pick-up medium without having recourse to the incorporation of such an equipment in the signal reproducing apparatus. This will mean that an information recording disc according to the present invention can be played back by the use of a semiconductor laser beam having a larger wavelength.

Experiments were conducted with an information recording disc 1 having a light-absorptive coating 4 on which signals were recorded with use of argon laser beams of different powers. The light-absorptive coating 4 was formed of cellulose nitrate and a dye sensitizer which were proportioned in the ratio of 86.5:13.5 on a weight basis. The recording disc 1 thus prepared was played back in a signal reproducing apparatus using a helium-neon laser beam as a signal pick-up medium. Tests were made for changes in the levels of reproducing radio-frequency (RF) signals, changes in the locations of oscillographic eye patterns and change in the average signal reproduction error factors per 30 seconds during the periods of 10 to about 50 minutes. The following table shows the results of these tests.

| Recording Power (mW) | RF Signal Levels (mVpp) | Eye Pattern Locations | Average Error Factors |
|---|---|---|---|
| 2.0 | 190 | Center | $4 \times 10^{-2}$ |
| 2.5 | 300–400 | Center | $7 \times 10^{-5}$ |
| 2.8 | 460 | Slightly below Center | $4 \times 10^{-5}$ |
| 3.0 | 550 | Slightly below Center | $4 \times 10^{-5}$ |
| 3.5 | 650 | Bottom | $8 \times 10^{-4}$ |
| 4.0 | 685 | Bottom | $2 \times 10^{-3}$ |
| 4.5 | 690 | Bottom | $6 \times 10^{-3}$ |

When, on the other hand, an information recording disc having a light-absorptive coating of photoresist developed and formed with information tracks of pits and coated with a light-reflective coating of metal is played back, it was found that the radio-frequency signals were on the levels of about 1000 to 1300 mVpp, the oscillographic eye patterns were located at the center or slightly below the center, and the average signal reproduction error factor was on the order of $10^{-4}$. It is thus understood that, when the power of the recording laser beam is selected at a suitable value (which ranges from 2.8 to 3.0 milliwatts) in recording signals on an information recording disc according to the present invention, the average error factor can be improved about ten times the error factor in reproducing signals from a conventional disc using a light-absorptive coating of photoresist. This means that signals are recorded on a recording disc according to the present invention with an accuracy which is increased about ten times the accuracy of recording of the signals on a disc using a light-absorptive coating of photoresist. In the case of an information recording disc produced in accordance with the present invention, furthermore, it has been ascertained that reproducing radio-frequency signals of the levels of about 460 milliwatts to about 550 milliwatts can be obtained when the signals are reproduced immediately after the mastering step. For this reason and further because of the fact that the oscillographic eye patterns were located slightly below the center, not only the signals can be read out with ease and can be monitored immediately after the mastering step but production of chemical residua can be avoided during formation of the pits in the light-absorptive coating of the disc. The disc per se can therefore be put to use as a final record with a practically acceptable signal-to-noise ratio.

If desired, the information recording disc 1 produced in accordance with the present invention as hereinbefore described may be used to produce a stamper. For this purpose, the light-absorptive coating 4 of the recording disc 1 is coated with an electrically conductive film by application of metal such as silver to the surface of the coating 4 by, for example, a vacuum evaporation, sputtering or non-electrolytic process. A layer of a release compound is formed on the conductive film and is then coated with metal such as nickel applied to the layer of the release compound by an electrotyping process. A stamper is thus obtained by releasing the outermost layer of metal from the recording disc 1. The metal disc prepared in this fashion may be utilized not directly as a stamper but as a master matrix to produce a mother matrix from which a sub-master matrix to produce a stamper is to be produced. The stamper thus produced may be used to produce replicas for use in a playback apparatus of the optical, static capacitance or piezoelectric type by selection of the material to form the replicas.

When the laminar structure of the substrate 2 and the light-absorptive and light-reflective coatings 3 and 4 is found unacceptable by monitoring the recorded signals during or immediately after the mastering step, the process is brought to an end promptly. In this instance, a new light-absorptive coating can be formed on the substrate 2 after removal of the light-absorptive coating 4 from the substrate 2 by application of a suitable organic solvent to the coating 4. Thus, an information recording disc provided in accordance with the present invention is more economical than a conventional information recording disc using a light-absorptive film of photoresist in the case of which the substrate cleared of the photoresist coating must be polished to remedy the roughness of the surface before a new coating of photoresist is formed on the substrate. The inorganic solvent to be used for removing the light-absorptive coating 4 from the substrate 2 as above described may be xylene but is preferably acetone for its high drying rate.

It will be apparent that, if the monitoring of the signals recorded on the light-absorptive coating 4 is not necessitated, the light-absorptive coating 4 may be formed on the substrate 2 directly, viz., without forming the light-reflective coating 3 between the substrate 2 and light-absorptive coating 4. It will also be apparent that the signals to be recorded on an information recording disc provided in accordance with the present invention are not limited to audio and/or video signals and that the disc per se can be used not only as a video disc and a pulse-code-modulated audio disc but also as any other type of information recording disc.

What is claimed is:

1. An information recording disc, comprising:
a generally circular substrate, and
a light-absorptive coating secured to said substrate, said light-absorptive coating being a mixture of cellulose nitrate having a degree of nitration higher than about 13% and a dye sensitizer, said dye sensitizer present in an amount sufficient for said coating to exhibit a noticeable light absorptivity, said cellulose nitrate being prepared from a starting cellulose containing at least about 97% alpha-cellulose.

2. An information recording disc, comprising:
a generally circular substrate,
a light-reflective coating formed on said substrate, and
a light-absorptive coating formed on the surface of the light-reflective coating said light-absorptive coating being a mixture of cellulose nitrate having a degree of nitration higher than about 13%, and a dye sensitizer, said dye sensitizer present in an amount sufficient for said coating to exhibit a noticeable light absorptivity, said cellulose nitrate being prepared from a starting cellulose containing at least about 97% alpha-cellulose.

3. An information recording disc as set forth in claim 1 or 2, in which said cellulose nitrate has a number average degree of polymerization within the range of from about 80 to about 95.

4. An information recording disc as set forth in claim 1 or 2, in which said cellulose nitrate has a degree of nitration higher than about 13 per cent and a number average degree of polymerization within the range of from about 80 to about 95.

5. An information recording disc as set forth in claim 1 or 2, in which said dye sensitizer is N-ethyl-N-oxyethylaniline 6. An information recording disc as set forth in claim 1 or 2, in which the ratio in weight between said cellulose nitrate and said dye sensitizer is from 86.5:13.5 to 80:20.

* * * * *